United States Patent [19]
Molino

[11] 4,385,769
[45] May 31, 1983

[54] INVALID SUPPORT CHAIR STRUCTURE

[76] Inventor: Joseph L. Molino, 2 Aurora Dr., Valley Cottage, N.Y. 10989

[21] Appl. No.: 217,032

[22] Filed: Dec. 16, 1980

[51] Int. Cl.$^3$ .......................... A47C 5/10; A61G 5/00; B62B 9/08; B62B 9/28

[52] U.S. Cl. ................................. 280/47.38; 128/134; 180/DIG. 3; 188/20; 280/30; 280/242 WC; 280/289 WC; 297/134; 297/DIG. 4

[58] Field of Search ..................... 280/47.38, 47.37 R, 280/47.37 TC, 47.39, 47.4, 47.41, 31, 30, 5.3, 29, 211, 289 WC, 242 WC, 650, DIG. 10; 180/6.2, 6.5, 6.48, 8 A, 7 R, 9.24 R, 65 F, 65 R, 209, 216, 242, 365, DIG. 3; 296/65 R; 5/81 R, 86; 128/359; 297/134, 66, 71, 330, 347, 352, 353, 417, 466, DIG. 4, DIG. 10; 188/16, 20, 68, 76

[56] References Cited

U.S. PATENT DOCUMENTS

| | | | |
|---|---|---|---|
| 1,300,033 | 4/1919 | Scorey | 297/DIG. 4 |
| 3,100,651 | 8/1963 | Reese | 280/30 |
| 3,917,312 | 11/1975 | Rodaway | 297/DIG. 4 X |

FOREIGN PATENT DOCUMENTS

| | | | |
|---|---|---|---|
| 956100 | 7/1949 | France | 280/30 |
| 1575354 | 9/1980 | United Kingdom | 297/DIG. 4 |

*Primary Examiner*—Joseph F. Peters, Jr.
*Assistant Examiner*—Mitchell J. Hill
*Attorney, Agent, or Firm*—Prutzman, Kalb, Chelton & Alix

[57] ABSTRACT

A multiple purpose wheel chair having a lower wheeled carriage and an upper invalid support chair detachable from the carriage for manually transporting and supporting an invalid in bed or for being bathed or for other purposes.

12 Claims, 4 Drawing Figures

FIG. 3
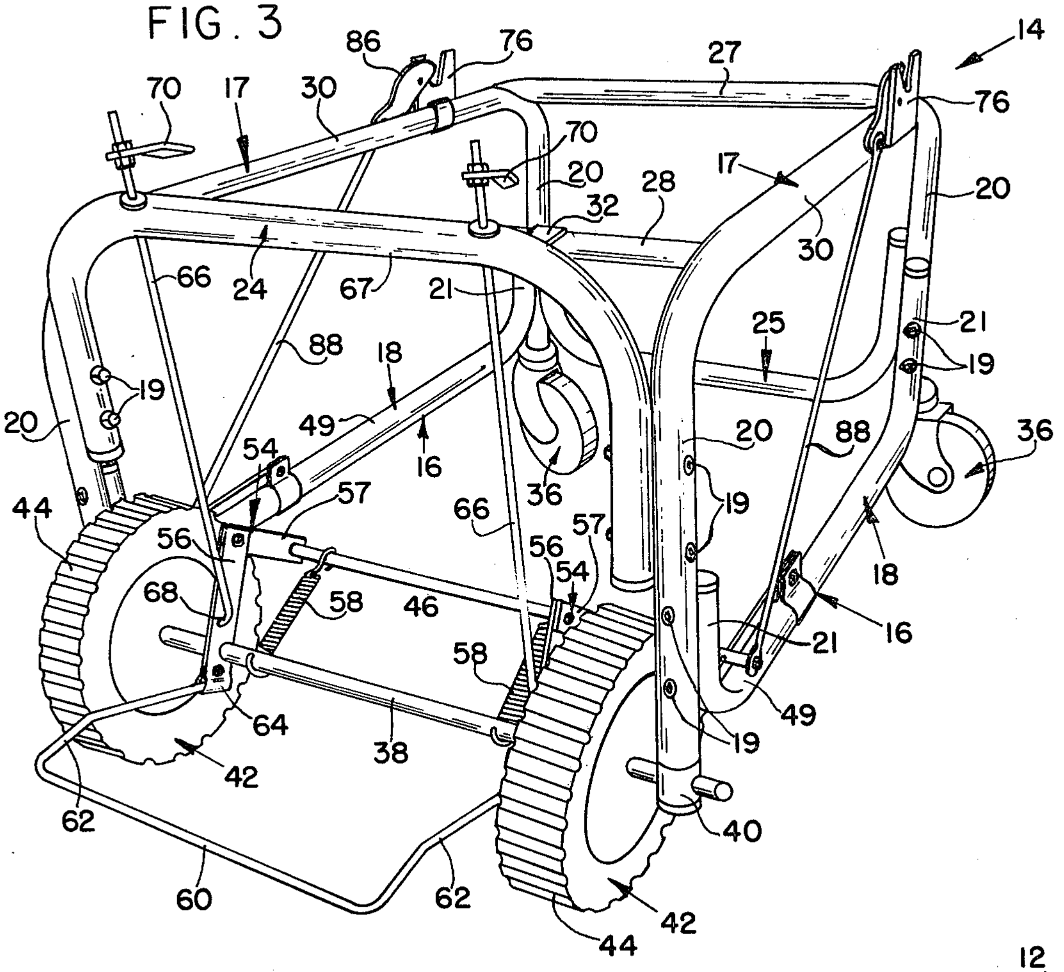
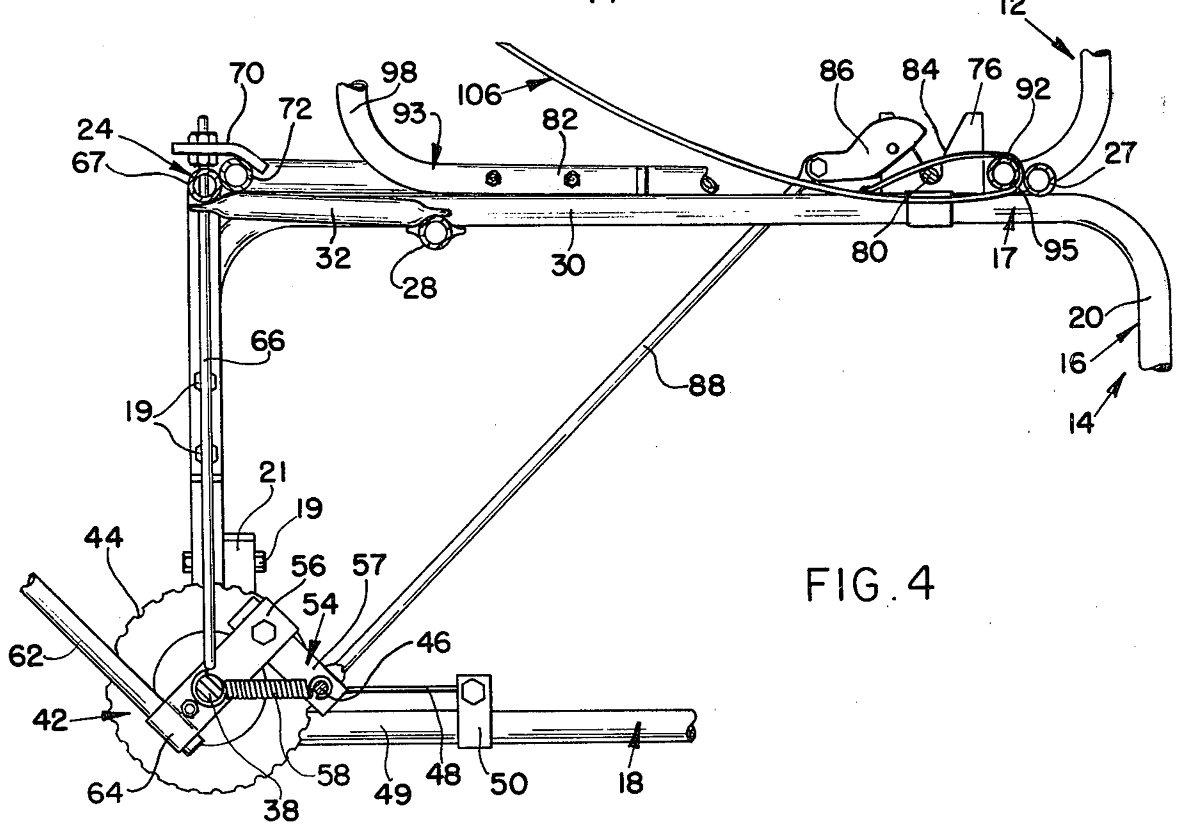
FIG. 4

INVALID SUPPORT CHAIR STRUCTURE

DESCRIPTION

Technical Field

The present invention relates generally to invalid chairs and more particularly to a new and improved invalid chair which is versatile in use as an invalid transporting means in a nursing home, hospital or other medical facility and as an invalid support for supporting an invalid (e.g. paraplegic, aged or other infirmed patient) upright in a bed or bathtub or for example for receiving therapy or meals.

Disclosure of the Invention

In accordance with the present invention, a new and improved invalid chair is provided which comprises a lower wheeled carriage and an upper invalid support chair adapted to be selectively mounted on the carriage for wheeled transportation of an invalid or without the carriage for support and manual transportation of an invalid.

It is a primary aim of the present invention to provide a new and improved invalid support chair which provides for firmly supporting and manually transporting an invalid and which is both lightweight and strong.

It is another aim of the present invention to provide a new and improved invalid support chair useful in supporting an invalid upright in bed and for bathing and receiving meals and therapy.

It is another aim of the present invention to provide a new and improved invalid support chair useful in combination with a wheeled carriage for use in transporting an invalid in the manner of a wheelchair and useful apart from the carriage for manually transporting and supporting for example a paraplegic or other infirm patient in a nursing home, hospital or other medical facility.

It is a further aim of the present invention to provide a new and improved combination carriage and invalid support chair useful together as a wheelchair and separable for manually transporting an invalid with the support chair.

It is another aim of the present invention to provide in a combination carriage and invalid support chair, a new and improved locking mechanism for selectively locking the carriage against movement and securing the invalid support chair to the carriage. In accordance with the present invention a combined carriage and support chair locking mechanism is provided which ensures that the carriage is locked against movement when the invalid support chair is released for manually transporting an invalid with the support chair. Also, the locking mechanism facilitates installation and removal of the chair from the carriage while supporting an invalid.

It is a further aim of the present invention to provide a new and improved carriage for a combination carriage and detachable support chair of the type described which provides a stable base for detachably and securely mounting an invalid support chair thereon.

It is another aim of the present invention to provide a new and improved combination carriage and detachable support chair which is adaptable to receive a commode for use by an invalid supported in the chair.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings

FIG. 3 is a generally rear elevation perspective view of a lower carriage of the invalid chair; and FIG. 4 is a side elevation section view, partly broken away and partly in section, of the invalid chair showing a chair locking mechanism for selectively locking the carriage against movement and the support chair to the carriage.

BEST MODE FOR CARRYING OUT THE INVENTION

Figure 1:
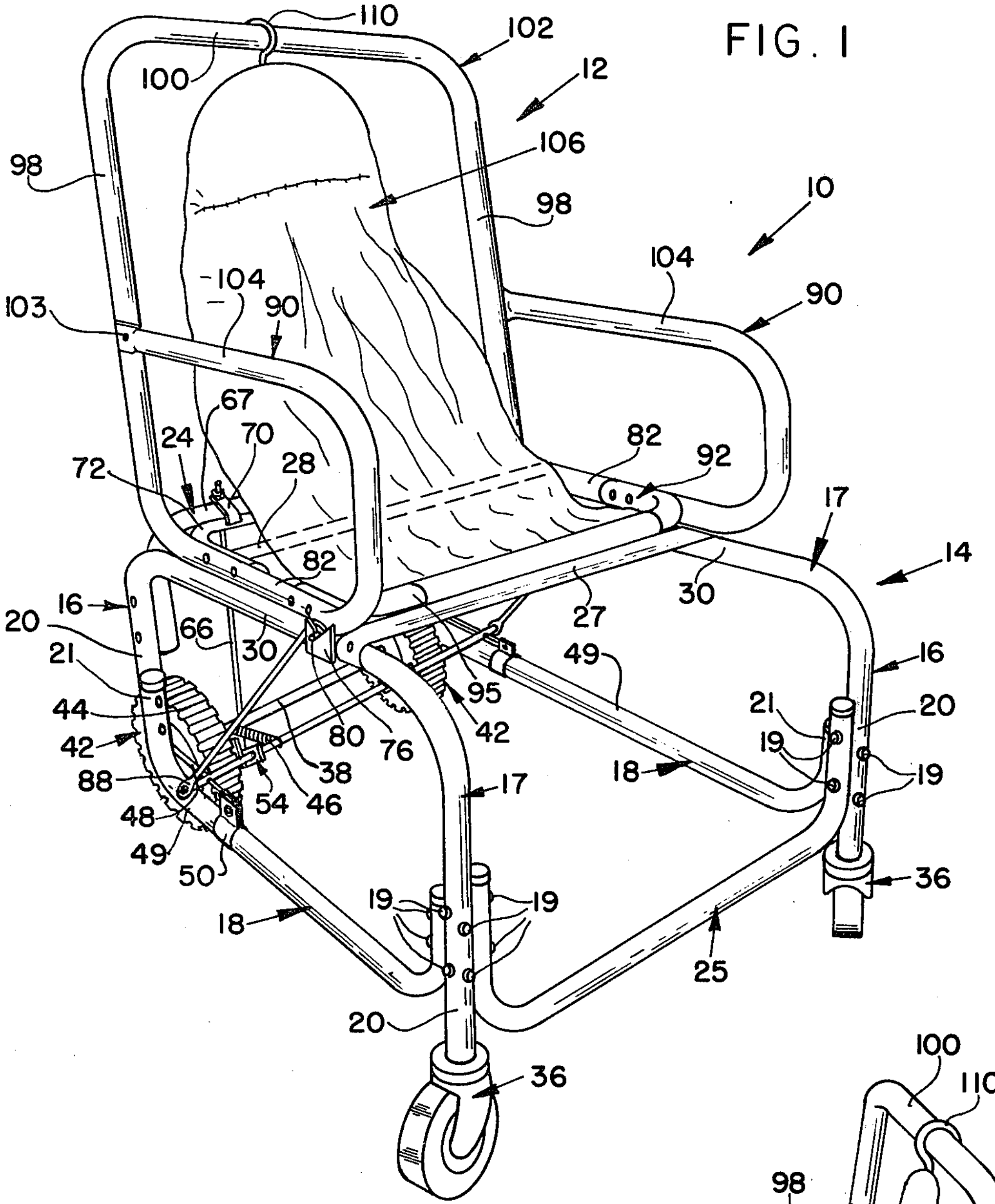
FIG. 1 is a generally front elevation perspective view of an invalid chair incorporating the preferred embodiment of the present invention.
Figure 2:
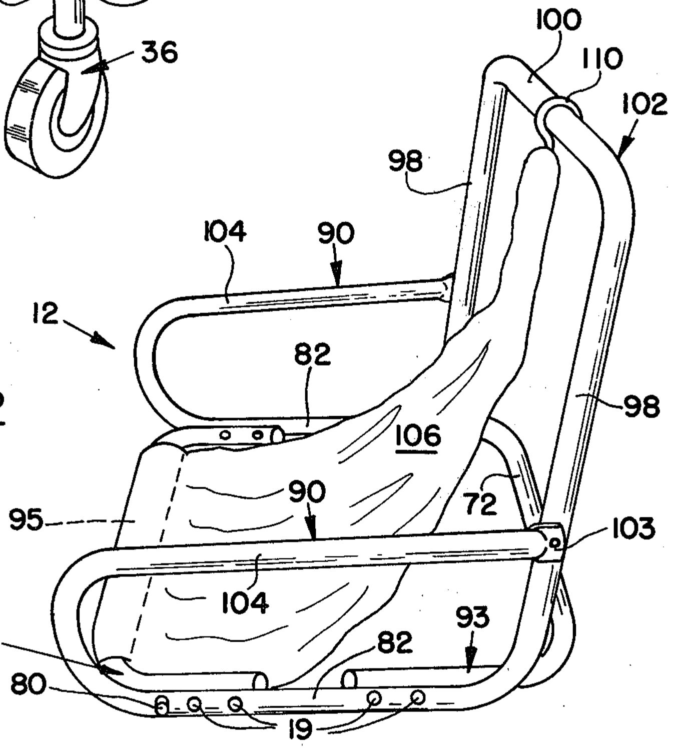
FIG. 2 is a generally side elevation perspective view of an upper support chair of the invalid chair.

Referring now to the drawings in detail wherein like numerals represent like parts, an invalid chair 10 incorporating the preferred embodiment of the present invention comprises an upper patient support chair 12 of tubular frame construction and a lower chair support carriage 14, also of tubular frame construction.

The tubular frame construction of both the lower carriage 14 and upper support chair 12 preferably is made of anodized aluminum tubing of medical quality, for example having a one inch outside diameter and a 0.049 inch wall thickness. The carriage frame comprises a pair of generally flat parallel side panels 16 each composed of a pair of generally U-shaped tubular frame members 17, 18 secured together by suitable bolts 19 extending through the outer relatively long depending legs 20 of the upper U-shaped frame member 17 and the inner relatively short upstanding legs 21 of the lower U-shaped frame member 18. The two carriage side panels 16 are connected by U-shaped tubular frame members 24,25 at the upper rear and lower front of the carriage. Also, front and rear transverse tubular support bars 27,28 are mounted between the upper parallel tubular rails 30 of the side panels 16, and a pair of short tubular stabilizer bars 32 are mounted between the rear transverse support bar 28 and the upper horizontal tubular section 67 of the rear transverse frame member 24. The upstanding legs of the front transverse frame member 25 and the depending legs of the rear transverse frame member 24 are connected to the depending legs of the carriage side panels 16 by suitable bolts 19 extending through those legs. The flat ends of the front and rear crossbars 27, 28 are secured to the top and bottom respectively of the upper parallel rails 30 of the carriage side frames 16 by suitable rivets, and the flat ends of the two short parallel stabilizer bars 32 are similarly connected by suitable rivets to the top of the rear crossbar 28 and to the underside of the transverse horizontal section 67 of the rear transverse frame member 24.

Swivel casters or wheels 36 are mounted within suitable inserts (not shown) provided in the lower ends of the forward depending legs 20 of the carriage side panels 16. A rear axle 38 is supported by suitable inserts 40 provided in the lower ends of the rear depending legs 20 of the carriage side panels 16, and a pair of relatively large rear wheels 42 are rotatably mounted on the rear axle 38 inwardly of and adjacent to the side panels 16. The rear wheels 42 have a cog type tread 44 with equiangularly spaced and axially extending cogs provided intermediate axially extending grooves for receiving a transverse locking rod 46 for locking the wheels against rotation.

The wheel locking rod 46 has a pair of transverse bores at its outer ends for mounting the locking rod 46 on a pair of guide rods 48 extending generally perpendicular to the rear axle 38 and parallel to the lower horizontal rail sections 49 of the side panels 16. The rear ends of the guide rods 48 are secured directly to the rear depending legs 20 of the side panels 16, and the forward ends of the two guide rods 48 are secured to the lower rail sections 49 of the side panels 16 by suitable clamps 50. The wheel locking rod 46 is connected to the rear axle 38 by a pair of laterally spaced over-center mechanisms 54, each having a pair of arms 56,57 pivotally connected to each other and to the rear axle 38 and to the locking rod 46. A pair of tension springs 58 are connected between the rear axle 38 and locking rod 46 for urging the locking rod 46 toward the rear wheels 42.

A rear generally U-shaped control lever or rod 60 is provided for operating the locking mechanism. The ends of the legs 62 of the control lever 60 are received within rear tubular end clamps 64 of the axle supported arms 56 of the over-center mechanisms 54 for operating the over-center mechanisms 54 to selectively lock the rear wheels 42 with the locking rod 46 and selectively shift the locking rod 46 forwardly out of engagement with the rear wheels 42.

The control lever 60 is adapted to be manually pivoted downwardly and rearwardly from its generally upright brake release position (where it engages a pair of generally vertical clamp operating rods 66 hereinafter described, when the upper support chair 12 is removed). The control lever 60 thereby pivots the over-center mechanisms 54 upwardly so their tension springs 58 can pull the locking rod 46 into engagement with the rear wheels 42. The control lever 60 is adapted to be manually lifted by foot or hand to shift the over-center mechanisms 54 downwardly and thereby shift the locking rod 46 forwardly out of engagement with the rear wheels 42.

The clamp operating rods 66 are mounted within vertical openings in the rear transverse horizontal tubular section 67. Lower right angle end portions of the clamp operating rods 66 are received within openings in the axle supported arms 56 of the over-center mechanisms 54. Suitable cotter pins are provided for preventing inadvertent withdrawal of the clamping rods from those levers. A pair of vertically adjustable clamping arms 70 are provided on the upper ends of the clamp operating rods 66, and when the wheel lock is released, the clamp operating rods 66 are pulled downwardly to bring the clamps 70 into engagement with a rear transverse tubular section 72 of a flat rectangular base of the upper support chair 12. The tension springs 58 provide for retaining the clamps 70 in operative locking engagement with the transverse tubular base section 72 of the upper support chair with a substantial force due to the mechanical advantage provided by the over-center mechanisms 54. When the wheel lock is operated to lock the rear wheels 42 by moving the lock control arm 60 downwardly, the clamps 70 are raised sufficiently to unlock the rear end of the upper support chair 12 from the carriage 14.

A pair of forward latch side plates 76 are mounted on the outside of the upper parallel side rails 30 of the carriage 14 by suitable clamps. Also, a pair of fixed laterally outwardly projecting studs 80 are provided on the lower tubular side rails 82 of the support chair 12 for receipt within generally vertical slot openings 84 provided in the latch side plates 76. A latch pawl 86 is pivotally mounted on each side plate 76 for locking the respective chair stud 80 within the latch locating slot 84, and latch operating rods 88 are provided to connect the transverse wheel locking rod 46 to the pivotal latch pawls 86. The front chair latches are thereby connected to lock the forward end of the support chair 12 to the carriage 14 when the rear wheels 42 are unlocked and to unlatch the forward end of the support chair 12 when the rear wheels 42 are unlocked.

The upper support chair 12 has a pair of flat generally rectangular tubular side panels 90 with lower parallel side rails 82 that engage and are supported on the upper parallel side rails 30 of the carriage side panels 16. Forward and rear generally U-shaped tubular frame members 92,93 connect the lower rails 82 of the support chair side panels 90 and provide therewith a lower flat rectangular base for the support chair 12. The U-shaped frame members 92,93 are connected to the lower chair side rails 82 by suitable bolts 19 extending through inwardly extending legs of the U-shaped frame members 92,93 and the lower chair rails 82. With the upper support chair 12 properly mounted and locked on the carriage 14, the front transverse tubular base section 95 of the support chair base is nested just rearwardly of the front transverse crossbar 27 of the carriage 16. Also, the rear transverse tubular section 72 of the support chair base is supported on the two parallel stabilizing bars 32 and is nested just forwardly of the rear transverse horizontal tubular section 67 of the carriage 16 to be locked in place by the rear clamps 70.

The two side panels 90 of the upper support chair 12 are preferably made from a single tube to have long upstanding rear legs 98 which are connected by an upper transverse section 100 to provide a generally U-shaped back frame 102 for the support chair 12. The rear flat ends 103 of the upper arms 104 of the chair side panels 90 are riveted to the outer edges of the upstanding rear legs 98 of the back frame 102.

A suitable sling seat 106 of preferably synthetic woven fabric is mounted between the lower front transverse tubular section 95 of the support chair base and the upper transverse section 100 of the chair back frame 102. The sling seat 106 has a front hem for receiving the front transverse section 95 of the chair base.

The sling seat 106 is connected to the back frame 102 for example by a suitable hook 110 to permit the sling seat 106 to be removed from the back frame 102 and for example draped over the front of the lower carriage 14. With the sling seat 106 removed from the back frame 102 in that manner, a commode or the like (not shown) can be mounted within the carriage 14 or for example to extend across the lower parallel rails 82 of the upper support chair 12 for use by a patient.

When the rear carriage wheels 42 are locked and the upper support chair 12 is thereby unlocked from the lower carriage 14, a person supported in the upper chair 12 can be readily manually carried with the chair 12, for example by two men located at the sides of the chair 12 by grasping the upper arms 104 of the chair 12 and raising the chair upwardly and forwardly from the carriage 14. A paraplegic or other invalid can be readily transported to and from the lower carriage 14 for example when carrying a patient to and from bed or to and from a bath tub or the like. To facilitate firmly holding an invalid within the chair 12, a suitable harness (not shown) with seat and shoulder belts may be employed where necessary or desirable because of the particular infirmity of the patient or invalid using the chair. Accordingly, the invalid chair is useful in a variety of situations for transporting a patient and using the upper chair 12 for supporting a patient upright while the patient is being manually carried or while the patient is in bed or taking a bath. Also, the upper support chair 12 can be readily mounted on the lower carriage 14 when desired for transporting the patient in the manner of a conventional wheel chair.

As will be apparent to persons skilled in the art, various modifications, adaptations and variations of the foregoing specific disclosure can be made without departing from the teachings of the present invention.

I claim:

1. An invalid support chair having a frame of tubular construction with a pair of upright generally parallel side panels, each formed by a single tubular member, having respective lower side rail tubular sections at the bottom of the side panels, upper arm tubular sections extending generally upwardly and then rearwardly from the front ends of the lower side rail sections to form upper arms of the side panels, and rear generally upright tubular sections extending upwardly from the rear ends of the lower side rail sections and connected to the upper arm sections at the rear ends of the upper arms, an upper transverse back frame tubular section extending between the upright sections of the side panels to form an inverted generally U-shaped back frame therewith, and front and rear generally U-shaped lower tubular base sections at the bottom of the support chair having front and rear transverse tubular base sections respectively and inwardly projecting leg sections connected to the lower side rail sections of the side panels at the front and rear ends thereof respectively, and a sling seat connected between said front transverse tubular base section and said upper transverse back frame section.

2. An invalid support chair according to claim 1 wherein said lower side rail sections and said front and rear base sections together provide a generally flat rectangular chair base.

3. An invalid support chair according to claim 1 or 2 wherein both side panels and the upper transverse back frame section are all formed by a single tubular member.

4. An invalid support chair according to claim 1 or 2 wherein the front and rear base sections are separate tubular members.

5. An invalid chair having a lower carriage with support wheels for moving the carriage and an upper base for receiving an invalid support chair and a separate upper support chair for separately transporting a patient having a lower base for selectively mounting the support chair on the upper base of the carriage, the carriage having manually operable locking means for selectively locking and unlocking certain carriage wheels for locking the carriage against motion and for selectively locking the upper support chair, when mounted on the upper base of the carriage, to the carriage, the locking means being manually operable for unlocking the upper support chair from the carriage only in conjunction with locking the carriage wheels to ensure the carriage is locked against motion when the support chair is unlocked for transporting a patient.

6. An invalid chair according to claim 5 wherein the carriage has a frame of tubular construction with a pair of upright generally rectangular and generally parallel side panels, each having a pair of opposed upper and lower generally U-shaped tubular members with respective upper and lower side rail sections and respective depending and upstanding overlapping leg sections secured together at the front and rear ends of the side panels, transverse tubular members connecting the side panels at the front and rear ends thereof and between the upper side rail sections of the pair of side panels to form with said upper side rail sections an upper base frame for receiving the lower base of the support chair for mounting the support chair on the carriage, the lower base of the support chair having bottom tubular side rail sections engageable with said upper side rail sections of the carriage and having transverse tubular base sections adapted for nested engagement with the transverse tubular members of the carriage for mounting the upper support chair on the carriage.

7. An invalid chair according to claim 6 wherein the depending leg sections of said upper U-shaped tubular members are outwardly of the upstanding leg sections of said lower U-shaped tubular members and wherein the carriage comprises a pair of swivel wheels supported from the lower ends of the depending leg sections of said upper U-shaped members of the carriage side panels at one end thereof.

8. An invalid chair according to claim 7 wherein the carriage comprises axle means supported from the lower ends of the depending leg sections of said upper U-shaped members of the carriage side panels at the other end thereof, and wherein a pair of carriage wheels are coaxially mounted on the axle means.

9. An invalid chair having a lower carriage with support wheels for moving the carriage and an upper base for receiving an invalid support chair and an upper support chair with a lower base for mounting the support chair on the upper base of the carriage, the carriage having manually operable locking means for selectively locking and unlocking certain carriage wheels for locking the carriage against motion and for selectively locking the upper support chair, when mounted on the upper base of the carriage, to the carriage and unlocking the upper support chair from the carriage and unlocking the upper support chair from the carriage only when the carriage wheels are locked, the carriage wheels comprising a pair of coaxial wheels, and the locking means being manually operable to simultaneously lock said pair of wheels and unlock the upper support chair from the carriage to permit withdrawal of the upper support chair only when said pair of wheels are locked.

10. An invalid chair having a lower carriage with support wheels for moving the carriage and an upper base for receiving an invalid support chair and an upper support chair with a lower base for mounting the support chair on the upper base of the carriage, the carriage having manually operable locking means for selectively locking and unlocking certain carriage wheels for locking the carriage against motion and for selectively locking the upper support chair, when mounted on the upper base of the carriage, to the carriage and unlocking the upper support chair from the carriage only when the carriage wheels are locked, the carriage wheels comprising a pair of coaxial wheels and the locking means comprising an elongated transversely extending wheel locking member mounted to be shiftable into and out of locking engagement with said pair of wheels, spring biased over-center means for operating the wheel locking member shiftable between alternative locking and unlocking over-center positions for shifting the wheel locking member into and out of wheel locking engagement, and manually operable means for shifting the spring biased over-center means between its locking and unlocking positions.

11. An invalid chair according the claim 9 or 10 wherein the locking means comprises a pair of side latches at the sides of the carriage for latching the side panels of the upper support chair to the carriage and latch operating means connected for unlocking both side latches when the wheels are locked and locking both side latches when the wheels are unlocked.

12. An invalid chair having a lower carriage with support wheels for moving the carriage and an upper base for receiving an invalid support chair and an upper support chair with a lower base for mounting the support chair on the upper base of the carriage, the carriage having manually operable locking means for selectively locking and unlocking certain carriage wheels for locking the carriage against motion and for selectively locking the upper support chair, when mounted on the upper base of the carriage, to the carriage and unlocking the upper support chair from the carriage only when the carriage wheels are locked, the locking means comprising a pair of side latches at the sides of the carriage for latching the side panels of the upper support chair to the carriage and latch operating means connected for unlocking both side latches when the wheels are locked and locking both side latches when the wheels are unlocked.

* * * * *